July 22, 1969  MASUO ISHIHARA  3,456,551

ANCHOR BOLT

Filed Aug. 25, 1967

INVENTOR
MASUO ISHIHARA
BY
ATTORNEY 3,456,551
ANCHOR BOLT
Masuo Ishihara, % Tamagawa Dormitory, Japan Drive-
It Co., Ltd., 1375, 2-chome, Sanno-machi, Kanagawa,
Prefecture, Japan
Filed Aug. 25, 1967, Ser. No. 663,393
Claims priority, application Japan, Sept. 5, 1966,
41/83,641
Int. Cl. F16b 13/04, 33/04
U.S. Cl. 85—79                                                3 Claims

ABSTRACT OF THE DISCLOSURE

The anchor bolt of the present invention is characterized by having wedge members disposed in inclined recesses in the external surface of the shank, and the wedges being biased into anchored relation by compression springs disposed in grooves behind the wedges and within the body of the bolt.

---

This invention relates to a novel and improved form of anchor bolt being adaptable for use in concrete, masonry and the like and more particularly relates to an anchor bolt of the type which is self-anchoring in blind holes in a positive, dependable manner.

In anchor bolts designed for use in concrete or masonry installations, it is generally known to employ a biasing element which in association with the wedge members will force the wedges in a direction to effect anchored relation within the hole. For example, in Patent No. 3,215,027 there is set forth and described an anchor bolt provided with diametrically opposed wedge members slidable along inclined recesses on opposite sides of the bolt shank, the wedge members being interconnected by a bale extending over the end of the shank, and a spring element is positioned between the bale and the end of the bolt shank to yieldingly urge the wedge members in a direction forwardly and outwardly along the inclined recesses into anchored relation with the wall of the hole. While this type of bolt is satisfactory in holes of uniform cross section in which the wedge members can be advanced for equal distances to effect anchoring engagement, it does possess certain limitations when used in holes of a cross-section other than circular, since one wedge member may effect wedging engagement before the other and therefore limit continued advancement of the other wedge into firm engagement on its side of the hole. In other words, the wedges, being interconnected and biased by a common spring element, are each limited by the other in their extent of advancement outwardly into anchored relation. Accordingly, it is desirable that the wedges be biased and movable independently of one another into wedging engagement with the wall of the hole so as to effect uniform wedging engagement with the hole notwithstanding variations in the cross sectional configuration of the hole.

It is therefore an object of the present invention to provide for a novel and improved anchor bolt of the type capable of self-anchoring in blind holes, and wherein wedge members on the bolt are independently biased and movable into anchored relation.

It is another object of the present invention to provide in a wedge-type anchor bolt for new and useful biasing means associated with each wedge member being so constructed and arranged as to permit the wedge members to lie normally within the peripheral outline of the shank during insertion into a hole and upon reverse movement of the shank in the direction of withdrawal automatically will initiate movement of the wedge members into wedging engagement with the wall of the hole.

In accordance with the present invention, an anchor bolt is provided with diametrically opposed, wedge-receiving recesses inclining forwardly and outwardly toward the leading end of the shank. A forwardly tapering wedge member corresponds in size and configuration to each recess so as to be capable of being disposed along the recess within the peripheral outline of the shank. Longitudinal grooves or bores are formed in the body of the shank behind and communicating with each recess to receive a compression spring member attached for extension rearwardly from each respective wedge member. Each spring element is inserted within the groove and attached at its trailing end so as to be under compression when the wedge member is lying in a position wholly within the recess. When the bolt is inserted in a hole corresponding in diameter to that of the bolt shank, the wedge members will be forced rearwardly to lie within the respective recesses until inserted to the desired extent within the hole. Then upon displacement of the shank rearwardly or outwardly in the direction of withdrawal of the hole the wedges being under compression will be advanced forwardly and outwardly along their recesses so as to wedge against the sides or wall of the hole under the biasing or expansion force of the springs. Each wedge element is therefore free to move independently of the other to effect its own wedging engagement with the wall of the hole. Moreover the wedges are held in anchored alignment with their respective recesses under the control of the springs for insertion into the hole. A washer element may be placed over the external surfaces of the wedge elements to retain the wedges in retracted relation along their recesses prior to insertion into the hole, then upon insertion the washer is forced rearwardly by the outer surrounding edge of the hole against a nut or other suitable tightening member at the rearward end of the bolt. When the nut is tightened it will cause movement of the bolt in the direction of withdrawal thus permitting the wedges to advance under the urging of the springs into anchored engagement.

The above and other objects, advantages and features of the present invention will become more readily appreciated and understood from a consideration of a preferred form of invention when taken together with the accompanying drawings, in which.

Figure 1:
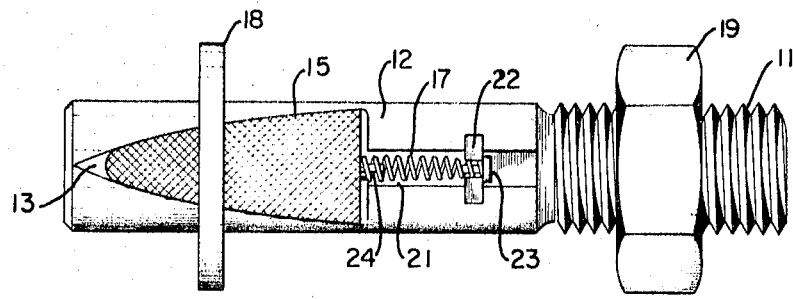
FIGURE 1 is an elevational view of a preferred form of anchor bolt assembly prior to its insertion in the hole.

Referring in more detail to the drawings, there is shown a preferred form of anchor bolt 12 having a threaded end portion 11 and being provided with diametrically opposed, wedge-receiving recesses 13 adjacent to its leading end. Each recess inclines forwardly and outwardly toward the leading end of the bolt shank, each for the purpose of receiving a forwardly tapered wedge member 15. In the form shown, each wedge is generally shovel-shaped and of a size and configuration corresponding to that of its recess, and has a generally circular external surface which is roughened as designated at 20 to make firm engagement with the wall of the hole; further, the wedge terminates in a relatively thick trailing end portion which is adapted to seat within the deeper end portion of the recess.

A longitudinal groove 21 extends rearwardly from communication with the deeper end of each recess along the external surface of the bolt shank, the groove being adapted to receive a coiled spring element 17. Each spring 17 is secured at one end to the trailing end of each wedge and at its opposite rearward end to the rearward portion of the groove, and normally the portion of the leading end of each spring projects forwardly from the groove into the recess. In order to facilitate attachment of the spring both to the wedge member and within the groove, a pin or binding element 24 is positioned on the trailing end of the wedge for insertion within the leading end of the spring, and a headed pin or binding element 23 is inserted and fixed within the trailing end of the spring. The spring is affixed against shifting or accidental release from its groove suitably by crimping the sides of the groove inwardly, as represented at 22, firmly against the spring and the pin 23.

Figure 2:
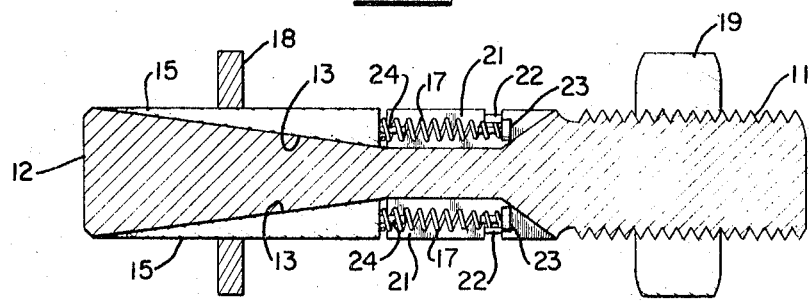
FIGURE 2 is a view partially in section of the preferred form of anchor bolt assembly taken at 90° to FIGURE 1.
Figure 3:
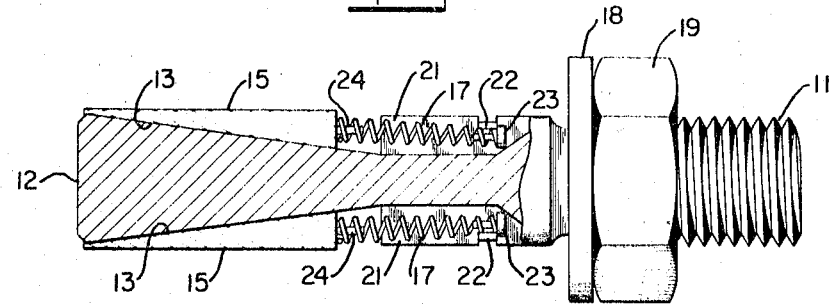
FIGURE 3 is a sectional view of the preferred form of anchor bolt and illustrating the relationship between elements upon movement of the wedge members outwardly into their expanded position.
Figure 4:
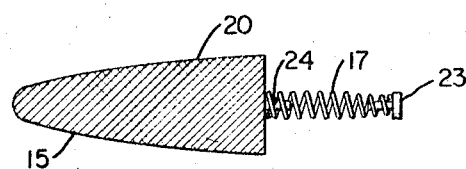
FIGURE 4 is a detailed view of one of the wedge-biasing members forming a part of the preferred form of the present invention.

The bolt assembly is completed by a nut 19 disposed on rearward threaded end 11 of the bolt and an annular washer 18 whose inner diameter corresponds to the diameter of the bolt and which may serve as a temporary retention means for the wedge members prior to insertion, for example, in the manner illustrated in FIGURES 1 and 2.

In use, a hole is formed corresponding to the diameter of the bolt. As stated, the bolt assembly prior to insertion in the hole has the washer element 18 advanced forwardly to retain the wedge members within their respective recesses, against the forward urging of the spring members 17. In other words, the washer element serves to mount the wedge members under compression within the recesses. When the bolt is inserted into the hole, the washer will be forced rearwardly away from the wedge member until it abuts the nut member 19. Nevertheless the wall of the hole will when the bolt is advanced forwardly retain the wedge members in retracted relation within the recesses and against the urging of the springs. Upon insertion to the desired depth in the hole, the wedges may be automatically advanced into anchored relation merely by tightening the nut 19 whereby to cause the shank to move rearwardly or in the direction of withdrawal from the hole, as a result of which the wedge members are movable under the constant urging of their springs forwardly along their inclined recesses and outwardly in a radial direction against the wall of the hole. Each wedge is free to move independently under the urging of its spring until firm anchored relation is established, and of course the wedging pressure may be regulated by the length and spring constant of the spring.

It will be evident from the foregoing that each of the combination wedge and spring members normally lie within the peripheral outline of the shank. In this relation, the depth of bore or groove 21 provided for each spring will depend of course on the size of the bolt and spring size desired. Furthermore, the wedge member will be free to advance forwardly once wedging engagement is established with the wall of the hole, and thus may be slidable along the entire length of its recesses until firm wedging engagement is established.

It will be appreciated from the foregoing that specific configuration both of the wedge members and recesses may be varied as well as their specific location and placement on the external surface of the shank. Moreover, two or more wedge members may be utilized at equal circumferentially spaced intervals on the shanks, as required. It is therefore to be understood that various modifications and changes may be made in the construction and arrangement of elements comprising the present invention.

I claim:

1. In an anchor bolt having a bolt shank provided with tightening means at the rearward end and wedge-receiving recesses each inclining outwardly toward the forward end of said shank from a relatively deep portion to a relatively shallow portion of the recess and a forwardly tapered wedge member disposed in each recess and being movable therealong into wedging engagement with the wall of a hole provided for said bolt, the combination therewith of a longitudinal groove extending rearwardly from the deeper portion of each recess and radially inwardly from the external surface of said shank and terminating short of said tightening means, a spring element being insertable in the groove with the forward end of said spring abutting the trailing end of each wedge member, said spring members being biased to yieldingly urge their respective wedge members forwardly and outwardly along the inclined recesses into wedging engagement with the wall of the hole upon movement of said shank in the direction of withdrawal from the hole, a pin member extending rearwardly from the trailing end of each wedge member for insertion through the leading end of each spring, and means in the groove for clamping the rearward end of each spring within the groove.

2. In an anchor bolt according to claim 1, further including a pin member extending forwardly through the trailing end of each spring, said clamping means embracing said spring and said second pin member.

3. In an anchor bolt according to claim 1, further including an annular washer ahead of said tightening means being slidable over said bolt shank into surrounding relation to said wedge members whereby to retain said wedge members retracted within their respective recesses prior to insertion of the bolt shank into the hole.

References Cited

UNITED STATES PATENTS

| 571,279 | 11/1896 | McKain | 85—79 |
| 1,110,797 | 9/1914 | Knox | 85—79 |
| 2,696,138 | 12/1954 | Olschwang. | |
| 2,774,273 | 12/1956 | Olson | 85—79 |
| 3,257,891 | 6/1966 | Lerich | 85—79 |

FOREIGN PATENTS

| 575,401 | 5/1959 | Canada. |
| 1,056,363 | 10/1953 | France. |
| 1,305,740 | 4/1962 | France. |
| 933,382 | 9/1955 | Germany. |

MARION PARSONS, Jr., Primary Examiner